United States Patent
Banerjee et al.

(10) Patent No.: US 11,163,934 B2
(45) Date of Patent: *Nov. 2, 2021

(54) OPTICAL RULE CHECKING FOR DETECTING AT RISK STRUCTURES FOR OVERLAY ISSUES

(71) Applicant: INTERNATIONAL BUSINESS MACHINES CORPORATION, Armonk, NY (US)

(72) Inventors: Shayak Banerjee, Austin, TX (US); William Brearley, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 195 days.

This patent is subject to a terminal disclaimer.

(21) Appl. No.: 16/404,816

(22) Filed: May 7, 2019

(65) Prior Publication Data
US 2019/0258774 A1    Aug. 22, 2019

Related U.S. Application Data

(63) Continuation of application No. 14/962,442, filed on Dec. 8, 2015, now Pat. No. 10,339,261, which is a (Continued)

(51) Int. Cl.
*G06F 30/398* (2020.01)
*G06F 30/33* (2020.01)
(Continued)

(52) U.S. Cl.
CPC ............ *G06F 30/398* (2020.01); *G06F 17/18* (2013.01); *G06F 30/33* (2020.01);
(Continued)

(58) Field of Classification Search
CPC ........ G03F 1/36; G03F 1/144; G03F 7/70633; G03F 7/705; G03F 7/70516;
(Continued)

(56) References Cited

U.S. PATENT DOCUMENTS 7,120,895 B2    10/2006    Ye et al.
7,310,789 B2    12/2007    Seligson et al.
(Continued)

FOREIGN PATENT DOCUMENTS

JP    2009511988 A    3/2009
JP    2011119457 A    6/2011

OTHER PUBLICATIONS

Notice of Allowance dated Apr. 24, 2019 in related U.S. Appl. No. 15/399,047, 11 pages.
(Continued)

*Primary Examiner* — Brian S Cook
(74) *Attorney, Agent, or Firm* — L. Jeffrey Kelly; Andrew M. Calderon; Roberts Calderon Safran & Cole, P.C.

(57) ABSTRACT

A method and system is provided for detecting at risk structures due to mask overlay that occur during lithography processes. The method can be implemented in a computer infrastructure having computer executable code tangibly embodied on a computer readable storage medium having programming instructions. The programming instructions are operable to obtain a simulation of a metal layer and a via, and determine a probability that an arbitrary point (x, y) on the metal layer is covered by the via by calculating a statistical coverage area metric followed by mathematical approximations of a summing function.

15 Claims, 5 Drawing Sheets

Related U.S. Application Data continuation of application No. 13/630,098, filed on Sep. 28, 2012, now Pat. No. 9,330,223.

(51) Int. Cl.
   *G06F 30/3323*   (2020.01)
   *G06N 7/00*      (2006.01)
   *G06F 17/18*     (2006.01)
   *G06F 111/08*    (2020.01)
   *G06F 119/10*    (2020.01)

(52) U.S. Cl.
   CPC ......... *G06F 30/3323* (2020.01); *G06N 7/005* (2013.01); *G06F 2111/08* (2020.01); *G06F 2119/10* (2020.01)

(58) Field of Classification Search
   CPC ............. G06F 17/5081; G06F 2217/12; G06F 17/5022; G06F 17/5068; G06F 2217/06; G06F 2217/10; G06F 2217/84
   USPC ....................................... 703/2, 13
   See application file for complete search history.

(56) References Cited

U.S. PATENT DOCUMENTS

| | | |
|---|---|---|
| 7,804,994 B2 | 9/2010 | Adel et al. |
| 7,816,062 B2 | 10/2010 | Nagatomo et al. |
| 7,873,937 B2 | 1/2011 | Ye et al. |
| 8,799,830 B2 | 8/2014 | Robles |
| 2005/0100802 A1 | 5/2005 | Callan et al. |
| 2005/0251771 A1 | 11/2005 | Robles |
| 2007/0083847 A1 | 4/2007 | Mansfiled et al. |

OTHER PUBLICATIONS

Bourov (Lithographic Process Window Analysis by Statistical Means, Proceedings of SPIE vol. 4689, 2002).

Orshansky (Design for Manufacturability and Statistical Design: A Constructive Approach, Springer 2008).

Hyperphysics (Gaussian Distribution Function, Dec. 22, 2011, downloaded from http://web.archive.org/web/20111222181949/http://hyperphysics.phy-astr.gsu.edu/hbase/m . . . ).

Chiro, Basic Difference Between Summation and Integration, Jun. 19, 2012, downloaded from http://www.physicsforums.com/threads/basic-difference-between-summation-and-integration.614997 teaches that "integration is a special kind of summation."

Via, IEEE 100 The Authoritative Dictionary of IEEE Standard Terms, Seventh Edition IEEE Press, 2000 teaches that a via is a connection between two different levels in a design.

Range, IEEE 100 The Authoritative Dictionary of IEEE Standard Terms, Seventh Edition IEEE Press, 2000 teaches that a range is the region between the lower and upper limits of a measured or generated function and illustrates that a "region" is an area. Therefore IEEE teaches that a range is an area between a lower and upper bound.

Range, Dictionary Definition: Vocabulary.com downloaded from http://web.archive.org/web/20120601063710/http://www.vocabulary.com/dictionary/range teaches that a range is "an area that something operates."

Wang, J., et al. Standard Cell Layout With Regular Contact Placement, IEEE Transactions on Semiconductor Manufacturing, vol. 17, No. 3, Aug. 2004.

Absolute_Value_Inequalities_2010, Algebra 2 Trig Lesson page, http://web.archive.org/web/20101201092859/http://www.regentsprep.org/Regents/math/algtrig/ATE2/absinequal.htm teaches absolute value inequity calculations.

Descritization_2009, Chapter 3 Discretization, Feb. 10, 2002 19:40:05 UTC/Rev 4d4a39156f1e pp. 59-67 teach to estimate the Gaussian function with a discretization.

Mack_2005 (C. A. Mack, "Thirty years of lithography simulation," in Proc. SPIE, B. W. Smith, ed., vol. 5754, pp. 1-12 (2005).

Lane, "Basic Concepts in Probability", dated Jun. 2011, downloaded from http://onlinestatbook.com/2/probability/basic_html), 6 pages.

Office Action dated Mar. 31, 2021 in related U.S. Appl. No. 16/512,566, 16 pages.

Final Office Action dated Jun. 29, 2021 in related U.S. Appl. No. 16/512,566, 17 pages.

OPTICAL RULE CHECKING FOR DETECTING AT RISK STRUCTURES FOR OVERLAY ISSUES

FIELD OF THE INVENTION

The present invention generally relates to the detection of at risk semiconductor structures which may occur during lithography processes, and more particularly, to a method and system for detecting at risk structures due to mask overlay that occur during lithography processes.

BACKGROUND

Overlay is a yield delimiter in current technologies, especially for contacts/vias covering metal. That is, overlay errors are a known source of yield loss in semiconductor manufacturing. Overlay can be as much as 25% of the minimum wire width in 22 nm technologies. As an example, overlay error between contact and metal can lead to poor contact between metal and via which degrades contact resistance and increases risk of electromigration. For this and many other reasons, overlay accuracy between two patterns, e.g., metal layer and contact or via is generally considered a big challenge for increasing yield.

Current methods of finding structures at risk due to overlay simply consider coverage area between layers, but this is an inaccurate measure since the same coverage areas could still mean different risk in presence of overlay. For example, Optical Rule Checking (ORC) predicts failure of wafer shapes due to process proximity effects. However, using ORC is a very complicated process, especially when being performed on mask shapes. Also, ORC does not provide an accurate method for detecting structures at risk due to overlay.

SUMMARY

In a first aspect of the invention, a method is implemented in a computer infrastructure having computer executable code tangibly embodied on a computer readable storage medium having programming instructions. The programming instructions are operable to obtain a simulation of a metal layer and a via, and determine a probability that an arbitrary point (x, y) on the metal layer is covered by the via by calculating a statistical coverage area metric followed by mathematical approximations of a summing function.

In another aspect of the invention, a system is implemented in hardware. The system comprises an overlay aware optical rule checking module configured to determine a probability that an arbitrary point (x, y) on a metal layer is covered by a via by calculating a statistical coverage area followed by a summing factor.

In an additional aspect of the invention, a computer program product comprises a computer usable storage medium having readable program code embodied in the storage medium. The computer program product includes at least one component operable to: obtain a simulation of a metal layer and a via; and determine a probability that an arbitrary point (x, y) on the metal layer is covered by the via by: calculating a statistical coverage area metric; and using mathematical approximations of a summing function, computed using a Gaussian distribution for the overlay error of the via. The statistical coverage area metric is based on equi-probability contours of the via which are summed after multiplying each area by its probability of being inside or outside of the coverage area.

In a further aspect of the invention, a computer system for at least one of modeling and forecasting technology adoption, the system comprises a CPU, a computer readable memory and a computer readable storage media. The system comprises program instructions which can provide the methods of the present invention. The program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to the detection of at risk semiconductor structures which may occur during lithography processes, and more particularly, to a method and system for detecting at risk structures due to mask overlay that occur during lithography processes. More specifically, the present invention relates to a method and system to detect structures at risk due to mask overlay during lithography simulation by computing a statistical coverage area metric. In embodiments, the statistical coverage area is computed assuming a Gaussian distribution for the overlay, followed by mathematical approximations of a summing function. Advantageously, the metric shows improved results in detecting vias (and/or contacts) which are potentially at risk due to overlay errors. It has been found through experimentation, the method and system of the present invention provides greater accuracy at finding at-risk vias compared to conventional Optical Rule Checks (ORC). Accordingly, the present invention provides an accurate method for detecting structures at risk due to overlay processes.

To detect at risk structures due to mask overlay that occur during lithography processes, the present invention combines mathematical rigor with engineering approximations to detect structures at risk, e.g., overlay errors. In embodiments, the methodology of the present invention is based on equi-probability contours which can be implemented in, for example, many different rule checking systems such as shown, for example, in FIG. 2 (discussed below), with little runtime overhead. The methodology of the present invention is also easily integrated into current ORC modules and current process flows. The method and system of the present invention also provides additional flexibility to use any via shape of choice, e.g., circular shape of nominal diameter, compared to conventional systems. Also, advantageously, by implementing the method and system of the present invention, it is possible to use a smallest diameter based on process assumptions or other contours from lithography simulations.

In current methodologies, ORC is the only way to detect structures at risk. However, such methodologies do not provide an accurate method for detecting structures at risk due to overlay. For example, in ORC, checks are written to measure coverage area from lithography contours. This has at least two known shortcomings: (i) via contours are not available during ORC of metal layer and vice versa, and (ii) coverage area is not a good indicator of overlay risk. As to the latter point, two structures having the same coverage area could have very different risk due to, for example, having sensitivity to different directions of overlay.

Figure 1A:
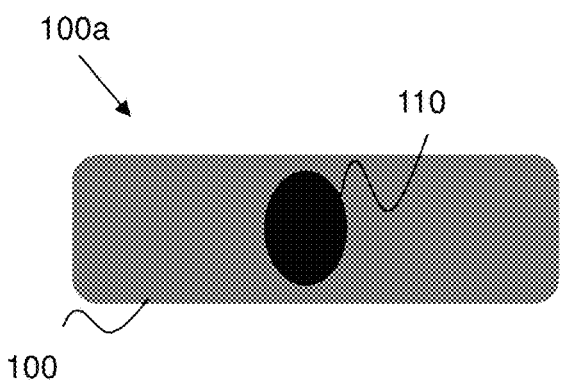
FIGS. 1a-1c show respective structures illustrating overlay risk.
Figure 1B:
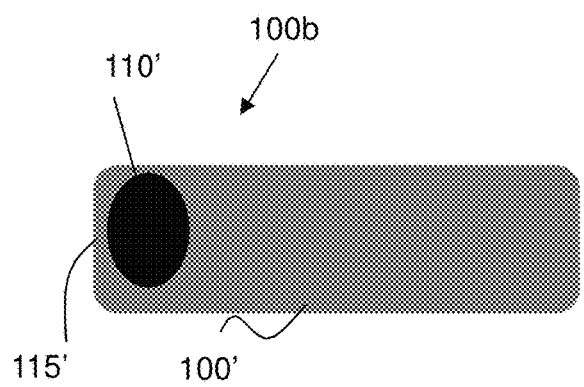
Figure 1C:
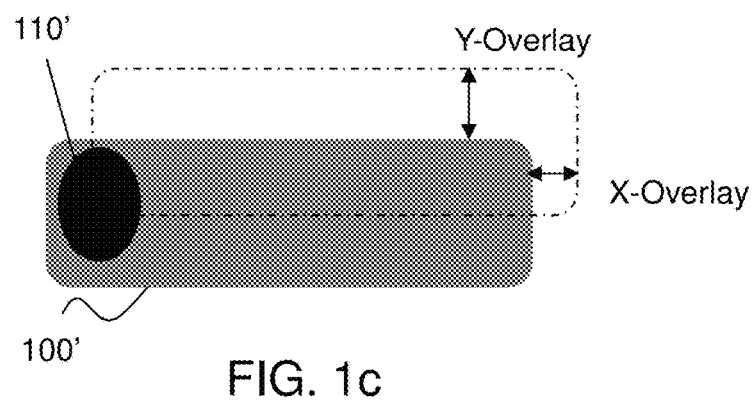

By way of illustrative example showing overlay issues, FIGS. 1a and 1b show respective structures 100a and 100b. In FIG. 1a, the structure 100a includes a metal layer 100 in direct contact with a contact or via 110, resulting in a 100% contact area. Similarly, the structure 100b includes a metal layer 100' in direct contact with a contact or via 110', resulting in a 100% contact area. However, the structure 100b of FIG. 1b is at greater risk of overlay error due to the location of the via 110' with respect to an edge 115' of the metal layer 100'. For example, as shown representatively in FIG. 1c, lithography overlay error can occur from misalignment of the lithography mask or other process tooling issue, resulting in the metal layer 100' being shifted to the right and/or upwards. This slight shift results in partial contact area between the metal layer 100' and the via 110'. This, in turn, results in degraded contact resistance and increased risk of electromigration. In contrast, the same shift or movement of the metal layer 100 in FIG. 1a would not result in the same overlay error, e.g., the metal layer 100 would remain in 100% contact with the underlying via 110. In embodiments, the method and system of the present invention can detect the at risk structure 100b due to mask overlay that occurs during lithography processes.

Figure 2:
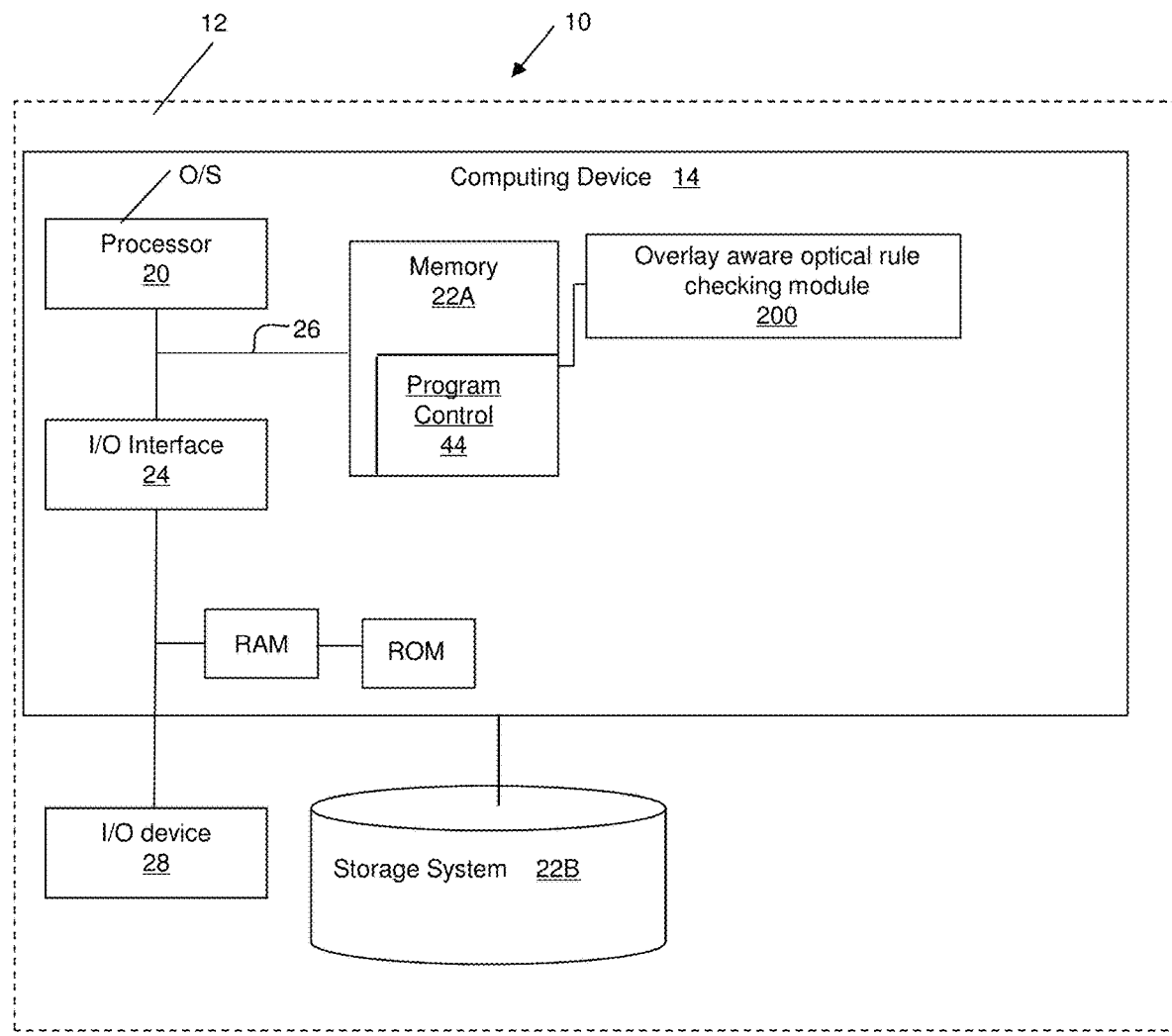
FIG. 2 shows an illustrative environment for implementing the steps in accordance with aspects of the invention.

As will be appreciated by one skilled in the art, the present invention can be implemented in the computing system of FIG. 2. More specifically, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 2 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 2). The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Referring still to FIG. 2, the computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an overlay aware optical rule checking module 200, e.g., the processes described herein. The overlay aware optical rule checking module 200 can be a combination of an overlay aware module and an ORC, easily integrated into a single or multiple modules. In embodiments, the overlay aware optical rule checking module 200 can be implemented as one or more program code in the program control 44 stored in memory 22A as separate or combined modules. Additionally, the overlay aware optical rule checking module 200 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the overlay aware optical rule checking module 200 of FIG. 2 computes probabilistic area of coverage. As should be understood by those of skill in the art, low probabilistic area will help detect structure at risk of failing electrically, e.g., due to electromigration. For purposes of this discussion, the present invention focuses mainly on via-metal overlaps; although other at risk structures can also be detected by implementing aspects of the present invention. Also, the present invention will focus on a first metal layer for detecting a via at risk; although other metal layers can be used to detect other at risk structures.

Figure 3:
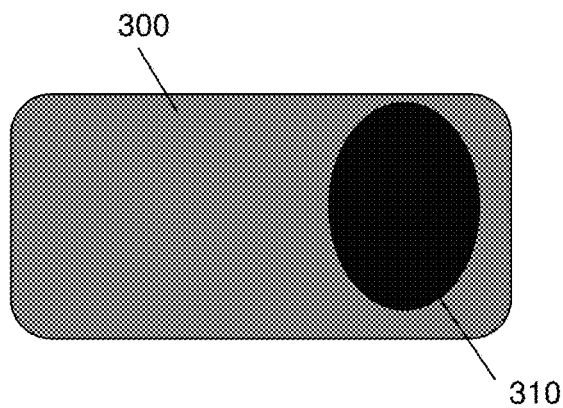
FIG. 3 shows a simulation of a first metal layer and a via, used in implementing aspects of the present invention.

FIG. 3 shows a simulation of a first metal layer and a via, used in implementing aspects of the present invention. More specifically, referring to FIG. 3, a simulation is shown of a first metal layer 300 and a via 310. It should be understood that the via 310 can be contact, and that although the shape of the via is circular, any shape can be implemented by the present invention. In this simulation, the via 310 is approximated by a circle with a diameter of $2R_v$. As should be understood by those of skill in the art, the diameter $2R_v$ is approximately the width of the via 310. The maximum overlay number is represented by V, in both the x and y directions. As should be known by those of skill in the art, the maximum overlay number V can be provided by a tool vendor and/or mathematically calculated using known equations. In embodiments, the tool vendor would also provide Vmin and Vmax values. In the example of the present invention, the overlay in the x and y directions will be represented by Ox and Oy, respectively. In embodiments, the present invention, e.g., the overlay aware optical rule checking module 200, can determine the probability that an arbitrary point (x, y) on the metal layer 300 is covered by the via 310.

Figure 4A:
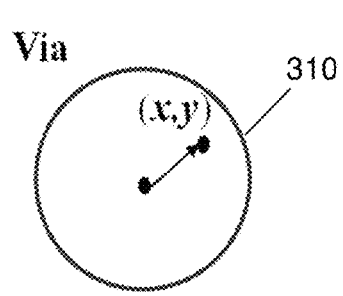
FIG. 4a shows an illustrative example of an arbitrary point (x, y) on a metal layer inside a via, used in implementing aspects of the present invention.

FIG. 4a shows an illustrative example of an arbitrary point (x, y) on a metal layer inside a via (or contact), used in implementing aspects of the present invention. More specifically, FIG. 4a shows the arbitrary point (x, y) on the metal layer is inside the via 310. In this scenario, the metal layer becomes uncovered only if 0 is less than –x and 0 is less than –y. The probability of the via covering (x, y) can then be written as:

$$P_{in}(\text{via covers } [x, y]) = 1 - P(O_x \leq -x \ \& \ O_y \leq -y) \quad \text{Equation (1)}$$
$$= 1 - P(O_x \leq -x)P(O_y \leq -y)$$
$$= 1 - \frac{1}{4}P(|O_x| \geq x)P(|O_y| \geq y)$$

$P_{in}$ is representative of the probability that the via covers the metal layer, at some arbitrary point. This equation can be calculated by the overlay aware optical rule checking module 200.

Figure 4B:
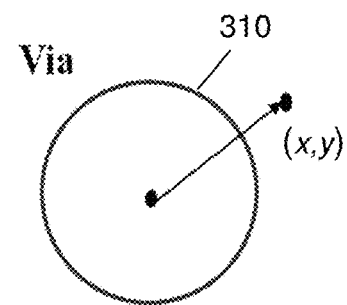
FIG. 4b shows an illustrative example of an arbitrary point (x, y) on a metal layer outside a via, used in implementing aspects of the present invention.

FIG. 4b shows an illustrative example of an arbitrary point (x, y) on a metal layer outside a via, used in implementing aspects of the present invention. More specifically, FIG. 4b shows the arbitrary point (x, y) on the metal layer outside the via 310. In this scenario, the metal layer becomes covered only if $O_x$ is greater than $(R_v-x)$ and $O_y$ is greater than $(R_v-y)$. The probability of the via covering (x, y) can then be written as:

$$P_{out}(\text{via covers } [x, y]) = P(O_x \geq (R_v - x) \,\&\, O_y \geq (R_v - y)) \quad \text{Equation (2)}$$
$$= P(O_x \geq (R_v - x))P(O_y \geq (R_v - y))$$

$P_{out}$ is representative of the probability that the via covers the metal layer, at some arbitrary point outside the nominal via shape, due to overlay error. This equation can be calculated by the overlay aware optical rule checking module 200. As $O_x$ and $O_y$ follows Gaussian distributions, it is possible to calculate for a $P_{in}$ and $P_{out}$. As should be understood by those of skill in the art, Gaussian distributions are engineering approximations. It should also be understood that that $P_{in}$ and $P_{out}$ can be calculated by knowing the exact distribution.

Figure 5:
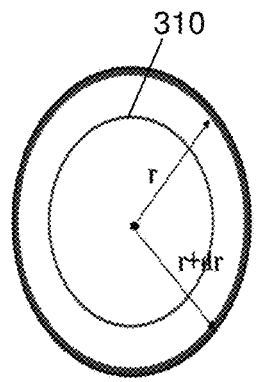
FIG. 5 shows a ring of radius "dr" at a distance "r" from a center of the via shown in FIG. 3, used in implementing aspects of the present invention.

FIG. 5 shows a ring 500 of radius "dr" at a distance "r" from the center of the via 310. This ring 500 shows the probability that the via (or contact) will cover the metal. More specifically, the ring 500 can be used to show that every point on the ring has some probability that the via will cover the metal layer. For example, the probabilistic area of contact made by the ring 500 can be written as:

$$dA_P = P(\text{via covers } [r, r]) \cdot M(r) \cdot A(r) \quad \text{Equation (3)}$$
$$= P(\text{via covers } [r, r]) \cdot M(r) \cdot 2\pi r dr$$

($A_r$) represents the area of ring, where $(A_r)=2\pi r dr$. M(r) is the fraction of the ring 500 on which metal exists $\varepsilon$ (0,1). Thus, $M(r)2\pi r dr$ is the area of the ring covered by the metal (which can be calculated by equation 5 below). In embodiments, $M(r)2\pi r dr$ can be a data point obtained by ORC tools. In this case, "0" represents no metal on the ring 500, whereas, "1" represents metal existing on an entire portion of the ring 500. Accordingly, P(via covers [r,r]) is the probability that the via covers the point [r, r], e.g., the arbitrary point (x,y).

Figure 6:
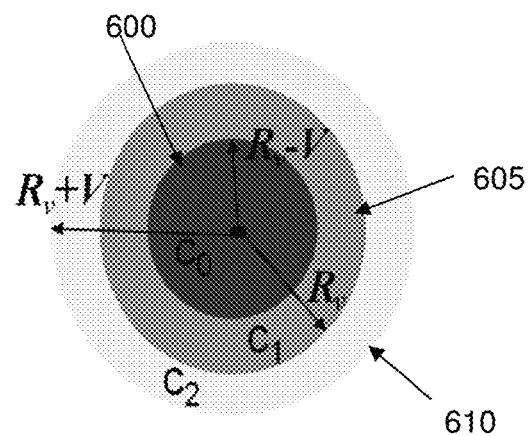
FIG. 6 shows equi-probability regions generated by sizing a via by a maximum overlay amount, in accordance with aspects of the present invention.

FIG. 6 shows equi-probability regions generated by sizing a via by a maximum overlay amount, in accordance with aspects of the present invention. More specifically, FIG. 6 shows three equi-probability regions generated by sizing the via by a maximum overlay amount V. In this representation, the regions include circle 600 (also represented as $C_o$), circle 605 (also represented as $C_1$), and circle 610 (also represented as $C_2$). It should be understood by those of skill in the art that equi-probability regions can include two or more equi-probability regions generated by sizing the via by a maximum overlay amount V, and that the three regions shown herein are provided for illustrative purposes only. Also, as discussed in detail below, the regions can be generated for any region between +V (Vmax) and -V (Vmin).

In embodiments, the total probabilistic area of contact made by the via can be obtained by integrating over $r_\infty$. In the below equation (4), P can be representative of either $P_{in}$ or $P_{out}$.

$$A_p = \int_{r=0}^{\infty} dA_P = \int_{r=0}^{\infty} P(\text{via covers } [r, r])Mr2\pi r dr \quad \text{Equation (4)}$$

Equation (4) provides the probability, from 0 to ∞, that every point within the radius will or will not be covered by the via. Equation (4), however, is a difficult problem to solve at fast runtimes required in ORC. Accordingly, the overlay aware optical rule checking module 200 will apply an engineering approximation by discretizing the equation (4). That is, the overlay aware optical rule checking module 200 can provide an approximation by finding P and [r,r], and calculating for $Mr2\pi r dr$.

By way of example and still referring to FIG. 6, the following assumptions are made for this illustrative, non-limiting example:

(i) the circle 600 (also represented as $C_o$) is always covered by the via (Pco=1);

(ii) the circle 605 (also represented as $C_1$) is often covered by the via, where $Pc_1 = 1 - P(-V \leq O_x \leq 0)P(-V \leq O_y \leq 0) = 0.75$; and (iii) the circle 610 (also represented as $C_2$) is sometimes covered by the via, where $Pc_2 = P(0 \leq O_x \leq V)P(0 \leq O_y \leq V)) = 0.25$.

For circles 600 and 605, $P_{in}$ can be calculated by the overlay aware optical rule checking module 200, using Equation (1); whereas, for circle 610, $P_{out}$ can be calculated by the overlay aware optical rule checking module 200, using Equation (2). That is, for any circle or shape that is always and/or often covered by the via, $P_{in}$ can be calculated using Equation (1), and for those shapes which are only sometimes covered (or partially covered) by the via, $P_{out}$ can be calculated using Equation (2). In this way, the probability area (P) can be calculated for any point on the circles 600, 605 and 610, using these equations.

In embodiments, the metal area covered by $C_o$ is represented as $A_{Co}$ and the metal area covered $C_n$ is $A_{Cn}$. That is, the covered metal area can be calculated for any number of regions. In the specific example of FIG. 6, for example, the metal area covered by $C_o$ is represented as $A_{Co}$, the metal area covered $C_1$ is represented as $A_{C1}$, and the metal area covered by $C_2$ is represented as $A_{C2}$. The approximate probabilistic coverage area of $A_p$ is then found using the following equation:

$$A_p = P_{Co}A_{Co} + P_{C1}A_{C1} + P_{C2}A_{C2} \quad \text{Equation (5).}$$

Equation (5) can equally be represented for any number of areas, as:

$$A_p \leq P_{Co}A_{Co} + \ldots P_{Cn}A_{Cn} \quad \text{Equation (6).}$$

As should be understood by those of skill in the art, the low probabilistic area corresponds to structures at risk due to overlay.

Figure 7:
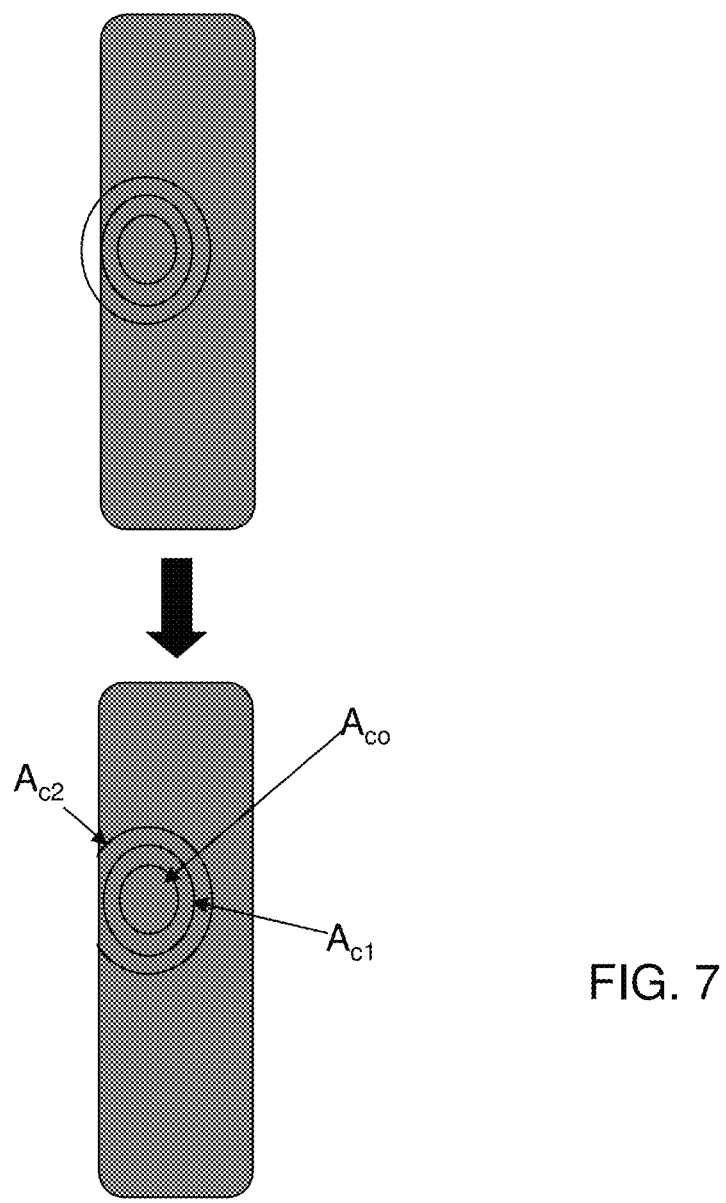
FIG. 7 shows a metal area coverage for at risk features, as calculated by implementing aspects of the present invention.

FIG. 7 shows a metal area coverage for at risk features, as calculated by implementing aspects of the present invention. Also, although three metal areas are shown in FIG. 7 and described herein, one of skill in the art should understand that the method of the present invention can be made more accurate with more equi-probability regions, e.g., more metal areas, $A_{C1}\, A_{C2}\, A_{C3} \ldots A_{Cn}$. Also, as shown in FIG. 7, the present invention provides the flexibility to use contour of choice and/or via shape of choice. As to the latter feature, it is possible to use the smallest diameter based on process assumptions or contours from lithography simulation.

Flow Diagram

Figure 8:
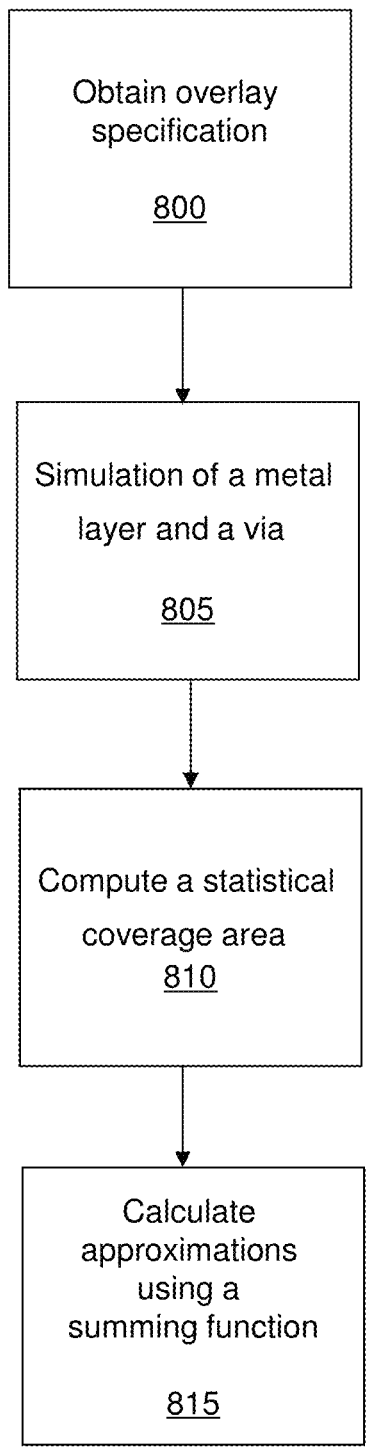
FIG. 8 shows an exemplary flow in accordance with aspects of the invention.

FIG. 8 shows an exemplary flow for performing aspects of the present invention. The steps of FIG. 8 may be implemented in the environment of FIG. 2, for example. The flowchart and block diagram in FIG. 8 illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 8 depicts an exemplary flow for a process in accordance with aspects of the present invention. At step 800, the processes of the present invention obtain an overlay specification. In embodiments, the overlay specification can be a maximum and minimum overlay number, provided by a vendor or calculated using known equations. The maximum overlay value is represented by V, in both the x and y directions. At step 805, the processes of the present invention provide and/or obtain a simulation of a metal layer and a via. At step 810, the processes of the present invention compute a statistical coverage area metric from a lithography simulation by determining a probability that an arbitrary point (x, y) on the metal layer is covered by the via and integrating this probability over the metal area. At step 815, the processes of the present invention follow the calculation of step 810 by mathematical approximations of a summing function, e.g., the discretizing problem as discussed above.

In embodiments, the processes of the present invention can determine when the arbitrary point (x, y) on the metal layer is inside or outside of the via. For example, the metal layer becomes uncovered only if $O_x$ is less than –x and $O_y$ is less than –y. Similarly, the metal layer becomes covered only if $O_x$ is greater than $(R_v-x)$ and $O_y$ is greater than $(R_v-y)$. The processes of the present invention can then determine the probability that the via will cover the metal layer, by providing an ring, with a radius "dr" at a distance "r" from the center of the via. In this scenario, a "0" value represents no metal on the ring, whereas, "1" value represents metal existing on an entire portion of the ring. In further embodiments, the processes of the present invention will generate equi-probability regions by sizing the via by a maximum overlay amount. The total probabilistic area of contact made by the via can be obtained by integrating over $r_\infty$ and discretizing the problem by calculations for coverage area for each of the equi-probability regions, e.g., $P_{in}$ and $P_{out}$.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing lithography and detecting at risk structures due to a lithographic mask overlay, comprising:
    performing a lithography process;
    performing the lithographic mask overlay; and
    the method of detecting being implemented in a computer infrastructure having computer executable code tangibly embodied on a computer readable storage medium having programming instructions operable to:
    determine a probability that an arbitrary point (x, y) on a metal layer is covered by a via; and
    detect the at risk structures of a semiconductor device during the lithography process in which a misalignment of the lithography mask overlay occurs when the metal layer is covered by the via by detecting a lithography error occurring from the misalignment of the lithography mask overlay based on the determined probability,
    wherein the arbitrary point (x, y) is defined by an x coordinate and a y coordinate in a cartesian coordinate system, and
    wherein determining the probability that the arbitrary point (x, y) on the metal layer is covered by the via comprises:
    determining that the metal layer is inside the via by calculating:

$$P_{in}(\text{via covers } [x, y]) = 1 - P(O_x \leq -x \text{ \& } O_y \leq -y) \quad \text{(equation 1)}$$
$$= 1 - P(O_x \leq -x)P(O_y \leq -y)$$
$$= 1 - \frac{1}{4}P(|O_x| \geq x)P(|O_y| \geq y)$$

wherein:
$P_{in}$ is representative of a probability that the via covers the metal layer, at the arbitrary point,
$O_x$ and $O_y$ follows Gaussian distributions to calculate for the $P_{in}$, and
P is a probability, and $O_x$ and $O_y$ is an overlay in a x direction and a y direction, respectively.

2. The method of claim 1, wherein the determining the probability that the arbitrary point (x, y) on the metal layer is covered by the via is performed by calculating a statistical coverage area metric followed by mathematical approximations of a summing function, and the mathematical approximations of the summing function includes engineering approximations to detect the at risk structures with the lithography error.

3. The method of claim 2, wherein the statistical coverage area metric is calculated from a lithography simulation.

4. The method of claim 2, wherein the statistical coverage area metric is computed using a Gaussian distribution for an overlay of the via.

5. The method of claim 4, wherein the statistical coverage area metric is based on equi-probability contours of the via.

6. The method of claim 5, wherein the equi-probability contours of the via are generated by sizing the via by a maximum overlay amount.

7. The method of claim 2, wherein the statistical coverage area metric comprises determining whether the arbitrary point (x, y) on the metal layer is inside or outside of the via.

8. The method of claim 1, wherein the via can be any shape of choice.

9. The method of claim 8, wherein the shape of the via is a circular shape.

10. The method of claim 1, wherein the steps of claim 1 are integrated into a rule checking system.

11. The method of claim 1, further comprising determining that the metal layer is outside the via by calculating:

$$P_{out}(\text{via covers } [x, y]) = P(O_x \geq (R_v - x) \text{ \& } O_y \geq (R_v - y)) \quad \text{(equation 2)}$$
$$= P(O_x \geq (R_v - x))P(O_y \geq (R_v - y))$$

wherein:
$P_{out}$ is representative of the probability that the via covers the metal layer, at the arbitrary point outside the nominal via shape; and
$O_x$ and $O_y$ follows Gaussian distributions to calculate for the $P_{in}$ and $P_{out}$;
$R_v$ represents the radius of the nominal via shape,
wherein the arbitrary point (x, y) is defined by the x coordinate and the y coordinate in a cartesian coordinate system,
wherein P is a probability, and $O_x$ and $O_y$ is an overlay in the x direction and the y direction, respectively.

12. The method of claim 11, further comprising determining that a point on the metal layer is outside the via ($P_{out}$),
wherein:

$$P_{out}(\text{via covers } [x, y]) = P(O_x \geq (R_v - x) \text{ \& } O_y \geq (R_v - y)) \quad \text{(equation 2)}$$
$$= P(O_x \geq (R_v - x))P(O_y \geq (R_v - y))$$

wherein:
$P_{out}$ is representative of the probability that the via covers the metal layer, at the arbitrary point which lies outside a nominal via shape,
multiplying each respective $P_{out}$ and $P_{in}$ by a covered area, and summing results,
wherein P is a probability, and $O_x$ and $O_y$ is an overlay in the x direction and the y direction, respectively.

13. The method of claim 1, wherein the misalignment of the lithography mask overlay results in a partial contact area between the metal layer and the via.

14. The method of claim 13, further comprising minimizing a diameter of the via based on the determined probability.

15. The method of claim 14, wherein the metal layer is a first metal layer of the semiconductor device.

* * * * *